United States Patent [19]

Ebihara et al.

[11] 4,240,150
[45] Dec. 16, 1980

[54] PORTABLE TIMEPIECE CALCULATOR WITH POWER SAVINGS FEATURE

[75] Inventors: Heihachiro Ebihara; Fukuo Sekiya, both of Tokorozawa; Takashi Yamada, Sayama, all of Japan

[73] Assignee: Citizen Watch Co., Ltd., Tokyo, Japan

[21] Appl. No.: 885,733

[22] Filed: Mar. 13, 1978

[30] Foreign Application Priority Data

| Mar. 15, 1977 | [JP] | Japan | 52/27595 |
| Mar. 18, 1977 | [JP] | Japan | 52/30026 |
| Mar. 23, 1977 | [JP] | Japan | 52/31833 |
| Apr. 18, 1977 | [JP] | Japan | 52/44251 |

[51] Int. Cl.³ ............... G06F 7/48; G06F 15/02; G04B 19/30
[52] U.S. Cl. ............................... 364/705; 364/707; 368/10
[58] Field of Search ............... 364/705, 707; 58/23 R, 58/50 R, 152 R

[56] References Cited

U.S. PATENT DOCUMENTS

| 3,788,058 | 1/1974 | Idei et al. | 58/50 R X |
| 3,816,730 | 6/1974 | Yamamoto et al. | 364/705 |
| 3,928,960 | 12/1975 | Reese | 58/152 R |
| 3,955,355 | 5/1976 | Luce | 364/705 X |
| 4,035,627 | 7/1977 | Dickinson et al. | 58/152 R X |

*Primary Examiner*—Jerry Smith

[57] ABSTRACT

A portable electronic device including a battery power supply, an oscillator for generating a time base signal, a timing pulse generator for generating timing pulses from said time base signal, shift registers for operations, and a display device for displaying the content of said registers, characterized by the provision of means for initiating and halting the operation of the timing pulse generator without disconnecting the power supply.

1 Claim, 9 Drawing Figures

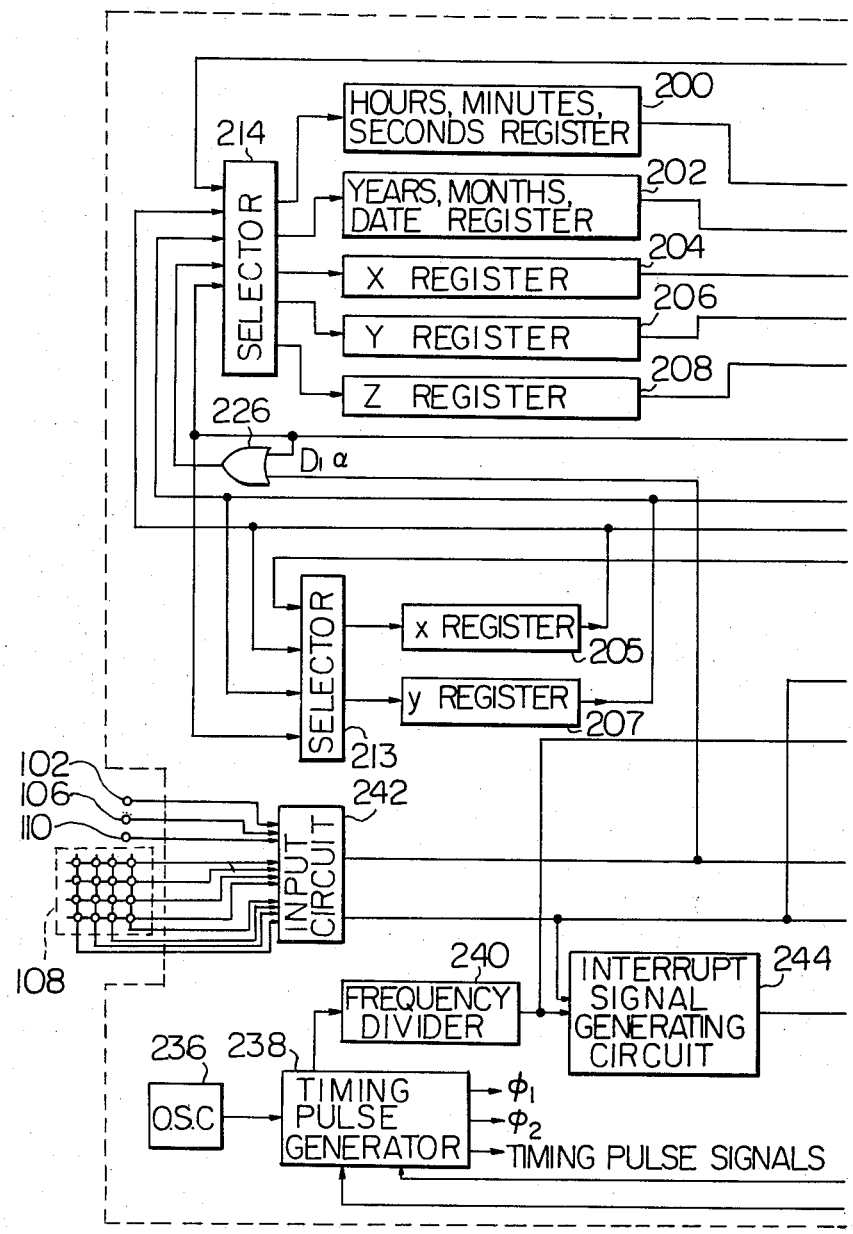

PORTABLE TIMEPIECE CALCULATOR WITH POWER SAVINGS FEATURE

BACKGROUND OF THE INVENTION

This invention relates to a portable electronic device equipped with a timing pulse generator.

In conventional portable electronic devices which make use of a timing pulse generator, such as calculators, electronic timepieces and electronic timepieces equipped with a calculator function, the timing pulse generator operated continuously while the power source was in the ON state. In recent years, the development of a light receptive type display device, namely a liquid crystal display device, has made it possible to reduce overall power consumption, thereby leading to the realization of portable electronic devices which can operate on small silver batteries. Since the power required for display purposes and the power consumed in a static manner by the circuitry has been greatly reduced, the dynamic power consumed by the timing pulse generator is relatively large by comparison. Since the line of timing pulses is widely circulated through the IC chip, the power consumed by the timing pulse generator cannot be ignored due to its effect upon battery lifetime. Thus, the continuous operation of the timing pulse generator while the battery is in the ON state was a major disadvantage encountered in the prior art.

SUMMARY OF THE INVENTION

It is therefore an object of the present invention to provide a portable electronic device in which the power consumed by a timing pulse generator is reduced.

To this end, the portable electronic device of the present invention is equipped with means for halting the operation of the timing pulse generator, whereby the generator is caused to cease generating pulses when such pulses are not required. More specifically, the generator begins generating pulses in response to an operation initiation instruction, and ceases generating pulses at the completion of an operation.

BRIEF DESCRIPTION OF THE DRAWINGS

In the accompanying drawings, in which:

FIG. 2 which comprises FIGS. 2A and 2B is a block wiring diagram of the portable electronic device shown in FIG. 1;

DESCRIPTION OF THE PREFERRED EMBODIMENTS

Figure 1:
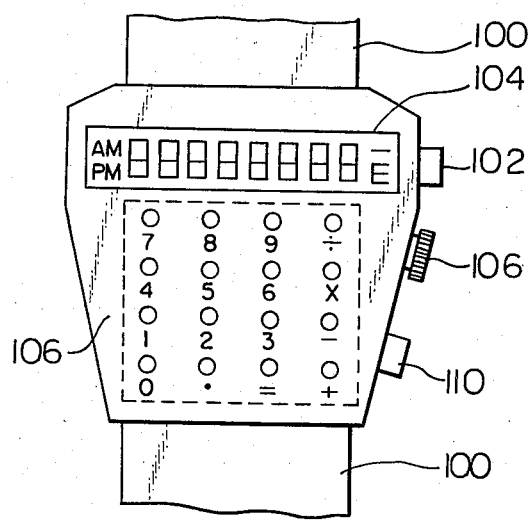
FIG. 1 is an external view of a preferred embodiment of a portable electronic device according to the present invention.

FIG. 1 shows the external appearance of a portable electronic device equipped with a calculator function and time-keeping function according to an embodiment of the present invention. The device is capable of being fastened to a wrist by means of a band 100. Manipulation of a switch 102 for mode change-over allows switching between a calculation mode and time-keeping mode, and between a time display mode of hours, minutes and seconds and a calendar display mode of years, months and date once the time-keeping mode has been established. A light-receptive liquid crystal display device 104 is adapted to perform the display of the mode selected by switch 102. A switch 106 is provided to establish a state for time correction; the hours, minutes and seconds as well as the calendar information can be set only when switch 106 is pulled out. A keyboard 108 is provided for calculation and time-setting purposes. The time is set by using the keyboard to directly establish the desired numerical values. When the device is in the normal time-keeping mode, inputs from the keyboard are ignored. A switch 110 serves as a clear switch for the calculation mode and a zero-reset switch for the time-setting mode.

Figure 2B:
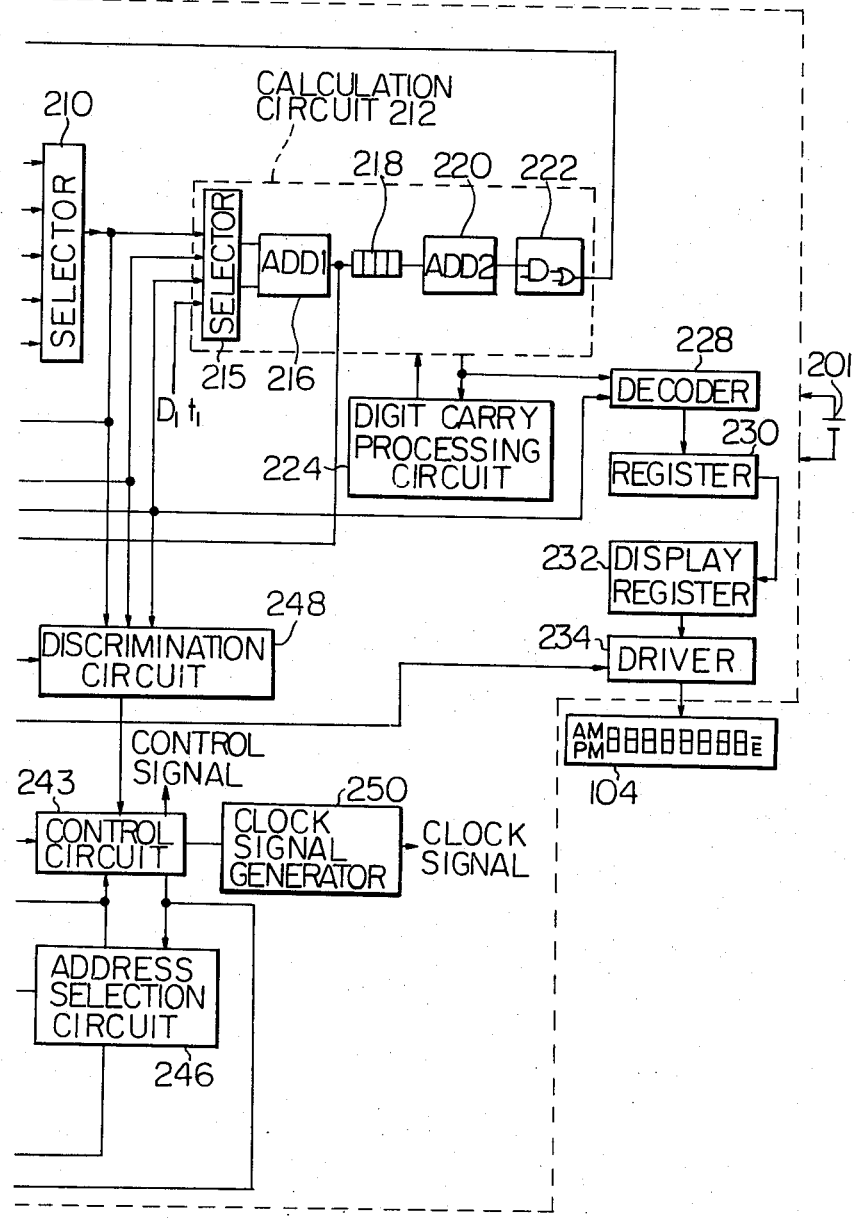

FIG. 2 is a block wiring diagram of the portable electronic device shown in FIG. 1. A battery 201 serves as a power source, and shift registers 200, 202 store time information indicative of hours, minutes and seconds, and years, months and date, respectively. These shift registers therefore serve a time-keeping function. An X-register 204, Y-register 206 and Z-register 208 are all shift registers for calculations. An x-register 205 is a 4 bit shift register for storing decimal point information which is included in the data held by X-register 204, and a y-register 207 is a 4 bit shift register for storing decimal point information included in the data held by Y-register 206. The shift registers 200, 202, 204, 206, 208, 205, 207, are all static or semi-static shift registers, and information can be stored statically even if no clock signals are being applied. Data indicative of the numerical values held by shift registers 200, 202, 204, 206, 208 is selectively fed to a calculation circuit 212 by a selector 210, and returned to the registers by a selector 214 following the necessary operations. The decimal point data of x-register 205 and y-register 207 is fed to the calculation circuit 212 where an adder 216 performs the required operations, and then is returned to the registers by a selector 213. The numerical data from selector 210 can be returned to the register unaltered through selector 214, or through a register OR gate 226 and selector 214, or through selector 213 and then through either x-register 205 or y-register 207 and finally through selector 214. There are also cases where the decimal point data of x-register 205 and y-register 207 is returned to the registers unaltered through selector 213 without passing through calculation circuit 212. When particular loop is chosen is determined by a control signal from a control circuit 243 which will be described later. The transfer of data from each register takes place only when a register clock signal generating circuit 250 produces clock signals for each of said registers as will be described later.

Calculation circuit 212 includes a selector 215 for selecting inputs, an adder 216, a 4 bit shift register 218, a compensating adder 220, and a 0-set, 1-set circuit 222. The content of 4 bit shift register 218 is inspected by a digit carry processing circuit 224 which supplies a digit carry instruction signal to calculation circuit 212. Data in 4 bit shift register 218 and decimal point data in x-register 205 are fed to a decoder 228 and converted to segment signals for display. When the data indicative of 1 digit is fed to 4 bit register 218, the output of decoder 228 is applied to a parallel IN/serial OUT shift register 230. A display segment signal from shift register 230 is applied in serial form to a display shift register 232. When the application of the 1 digit display segment signal to display shift register 232 has been completed, a display segment signal for the next digit is applied in parallel form to parallel IN/serial OUT shift register 230 and is again transferred to display register 232. Shift register 232 is also designed to store information in a static manner. Driver 234 is adapted to drive liquid crystal display device 104 according to the content of display register 232.

An oscillator 236 generates a time base signal and is preferably a quartz crystal controlled oscillator for the sake of timepiece accuracy and reduced power consumption. A system is adopted in which the oscillating frequency is 32.768 KHz, and wherein calculations are capable of being completed within 1 second. The time base signal is coupled to a timing pulse generator 238 which produces clock pulses $\phi_1$, $\phi_2$ for each register as well as a variety of timing signals. A frequency divider 240 divides the time base signal or a signal obtained by dividing the time base signal, thereby producing a standard time signal which is applied to an interrupt signal generating circuit 244. The standard time signal employed in the present embodiment is a 1 Hz signal. The signals obtained by manipulating the external control switches 102, 106, 110 and the keyboard 108 of FIG. 1 are decoded by an input circuit 242 and then coupled to a control circuit 243 and the interrupt signal generating circuit 244. The interrupt signal generating circuit 244 in response to the standard time signal from frequency divider 240 and an external control member-induced signal from input circuit 242 generates an interrupt signal which sets an address selection circuit 246 to a time-keeping operation. A discrimination circuit 248 inspects the content of each register and supplies the results of a discrimination to the control circuit 243. The control circuit 243 produces a variety of control signals from the address of the address selection circuit 246, the result of the discrimination supplied by discrimination circuit 248, and the signals from input circuit 242 which originate from the external control members. The address selection circuit selects a next predetermined address. A register clock generating circuit 250 generates, according to need, clock signals for each register from the control signals supplied by the control circuit and the signals $\phi_1$, $\phi_2$ produced by the timing generator. The clock signal delivered by the control circuit to the register clock generating circuit is accomplished when the address of the address selection circuit 246 is an operation address or display transfer address; in other words, only when the selection circuit is not in the initial state. Accordingly, each address register operates only when there is a calculation or a display data transfer performed; during ordinary operation, the registers continue to store data in a static manner. Thus, dynamic current consumption in the shift registers is eliminated during ordinary operation.

Address signals from address selection circuit 246 are also applied to input circuit 242. The input circuit, in response to such an address signal, inhibits the loading of signals from the external control members when the address of the address selection circuit is a calculation or display address, that is, when the address is not in the initial state. When the address of the address selection circuit returns to the initial state, the timing pulse generator 238 ceases generating timing pulses. Hence, power consumed by the timing pulse generator 238 is also eliminated during ordinary operation.

When the 1 Hz standard time signal produced by frequency divider 240 falls, interrupt signal generating circuit 244 generates an interrupt signal which sets address selection circuit 246 to a time-keeping operation address. When this occurs, control circuit 243 produces a control signal which, in a time of one word cycle, selects a return loop such that the data in hours, minutes and seconds register 200 is transferred and returned through selector 210, calculation circuit 212 and selector 214. At the same time, register clock generating circuit 250 generates a clock signal for said register 200 and the 4 bit shift register 218, whereby the data in register 200 makes one cycle through the abovementioned loop. At this time, selector 215 selects the output of selector 210 and $D_1 t_1$ signal as the inputs to an adder 1 block. The $D_1 t_1$ signals are signals which attain a "1" logic level when the LSB of a 1 second digit in register 200 is passed by the adder 1. Accordingly, the time information held in register 200 is replaced by time information which has advanced by 1 second. Over the next one word cycle, control circuit 243 produces a control signal adapted to select a return loop such that the data in years months, and date register 202 is transferred and returned through selector 210, calculation circuit 212 and selector 214. At the same time, register clock generating circuit 250 generates a clock signal for the register 202 and the 4 bit shift register 218, whereby the data in register 202 makes one cycle through the abovementioned loop. At this time, if the register is generating a carry signal during the one word cycle, 1 is added to the LSB of the register. The time-keeping operation address is completed in these two word cycles. In the calculation mode, the address selection circuit returns to the initial state upon completion of the time-keeping operation. In other words, in the calculation mode, there is no time display; only the operation is performed. In the time-keeping mode, a shift is made to the display transmission address when the time-keeping operation address in completed. According to the display address for the hours, minutes and seconds mode of the timepiece mode, the control circuit produces a control signal adapted to select a return loop such that the data in the hours, minutes and seconds register 200 is transferred and returned through selector 210, operation circuit 212, and selector 214. Simultaneously, register clock generating circuit 250 generates clock signals for register 200, 4 bit shift register 218, parallel IN/-serial OUT shift register 230, and display register 232. During this cycle, the time information in register 200 is converted to a display segment signal which is stored in display register 232. Display device 104 displays the time in hours, minutes and seconds in accordance with the information in the display shift register 232. According to the display transmission address for the years, months, and date mode of the timepiece mode, time information in years, months and date register 202 is similarly converted to a display segment signal which is stored in display register 232 and displayed in terms of years, months and date by the display device 104.

When the display transfer address is completed, address selection circuit 246 returns to the initial state, and the timing pulse generator as well as each register ceases operation. Only oscillator 236, frequency divider 240 and driver 234 operate during the period that address selection circuit 246 is in the initial state. When the address selection circuit is not in the initial state, signals from manipulation of the external control members cannot be loaded into input circuit 242; such loading is possible only after the selection circuit has returned to the initial state.

In the calculation mode, manipulation of keyboard 108 produces signals which are loaded in input circuit 242, whereupon the input circuit supplies a signal to interrupt signal generator circuit 244 which accordingly generates an interrupt signal that sets address selection circuit 246 to the calculation address. In the calculation address, control circuit 242, in accordance with the calculation procedure indicative of the selection circuit address, produces control signals adapted to establish the loops necessary for X-register 204, Y-register 206, Z-register 208, x-register 205 and y-register 207. When this operation is completed, the selection circuit address shifts to the display transfer address. The result of the calculation is stored in X-register 204. In the calculation mode display address, control circuit 243 and register clock generating circuit 250 produces signals adapted to convert the numerical data in X-register 204 to display segment signals which are then transferred to display register 232. When the address of the selection circuit 246 is a calculation or display address, an interrupt signal is generated due to the standard time signal, whereupon the flip-flop in the selection circuit is set. The flip-flop waits until the address returns to the initial state, sets the address to the time-keeping operation address when the initial state is restored, and is then reset itself. According to the system of the present embodiment, the longest calculation can be processed within 1 second so that no time-keeping error results.

Figure 3:
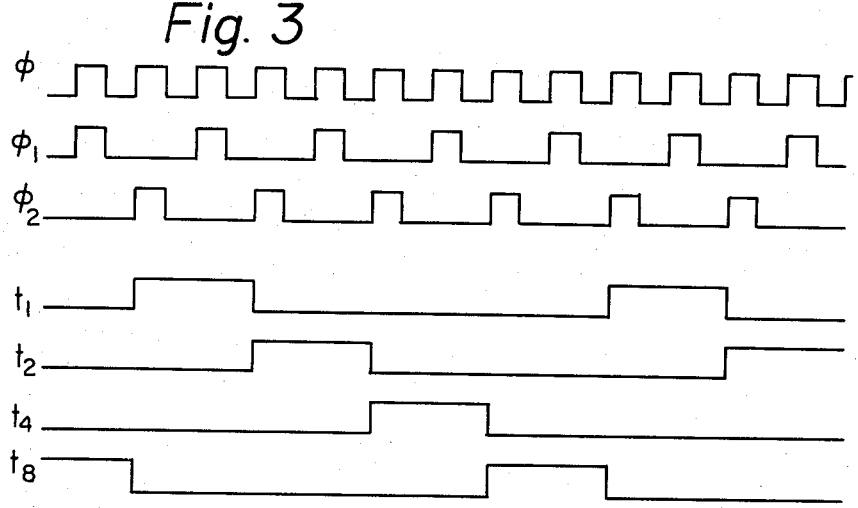
FIGS. 3 and 4 are timing charts of timing pulses used in the circuit of FIG. 2.
Figure 4:
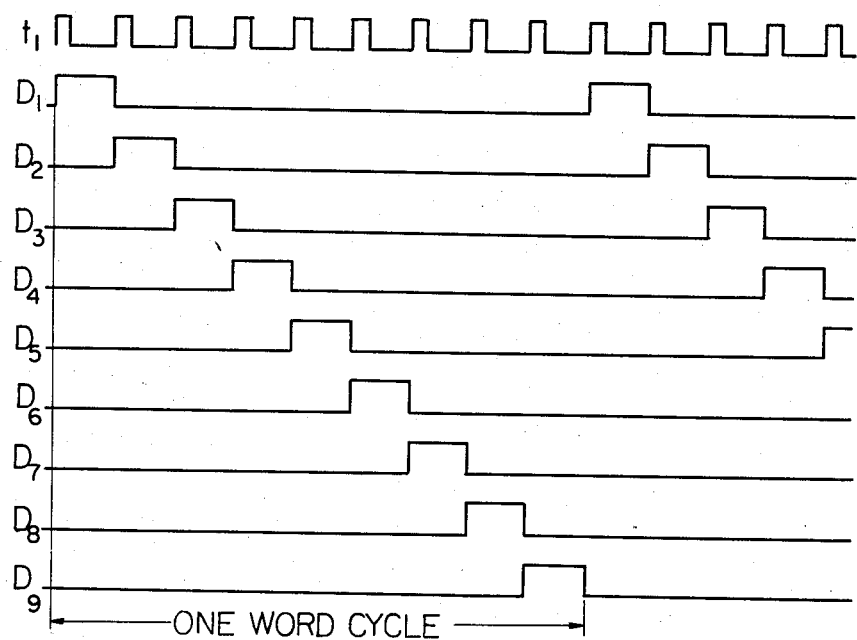

FIGS. 3 and 4 are timing charts showing the clock signals and the various timing pulses employed in the present embodiment. Signal $\phi$ is the 32.768 KHz time base signal produced by the oscillator, and the signals $\phi_1$, $\phi_2$ are the signals which serve as the clock signals for the shift registers. Accordingly, each shift register is shifted at a rate of 16.384 KHz. The signals $t_1$, $t_2$, $t_4$, $t_8$, $D_1$–$D_9$ are timing pulses, wherein one word cycle is defined as the period from the rising portion of signal $D_1$ to the decaying portion of signal $D_9$.

Figure 5:
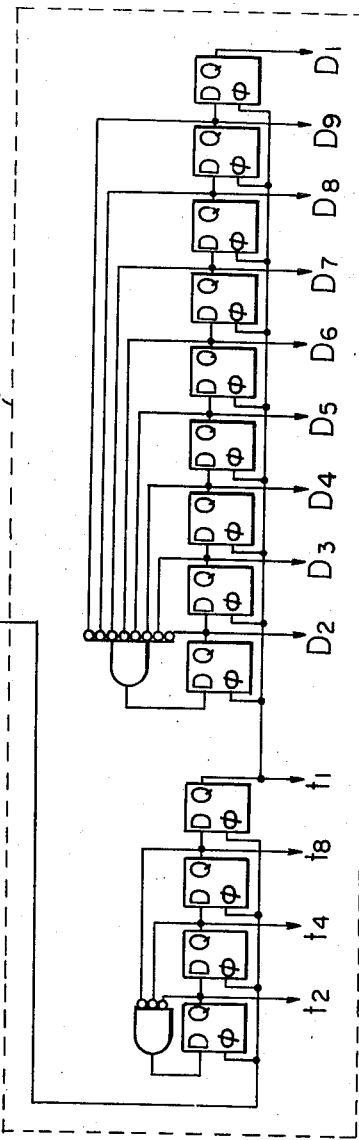
FIG. 5 is a preferred example of a timing pulse generator circuit and a control circuit forming part of the device shown in FIG. 2.
Figure 5:
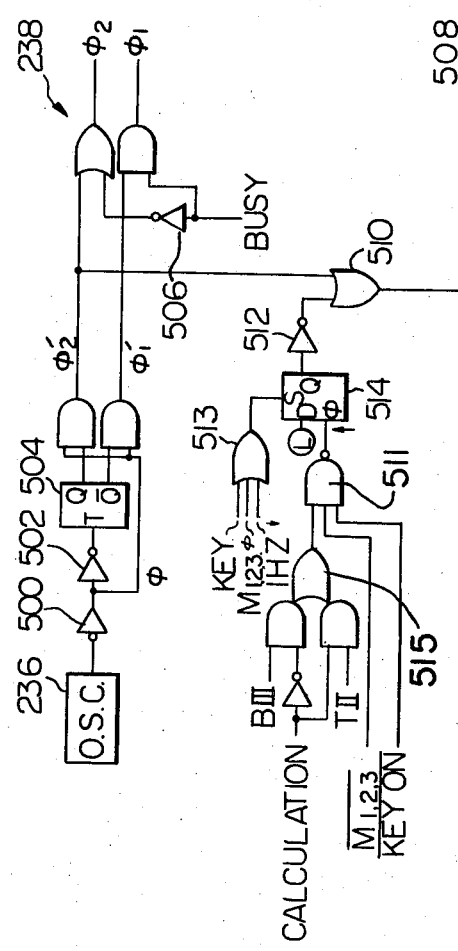

FIG. 5 shows the oscillator 236, an embodiment of timing pulse generator 238, as well as an embodiment of a portion of the control circuit 243 which is adapted to halt the generation of output signals from generator 238.

In FIG. 5, the time base signal from the oscillator passes through inverters 500, 502 and is coupled to a toggle flip-flop 504 where it is divided by 2. The Q and $\overline{Q}$ outputs of the flip-flop are subjected to an AND operation with the signal $\phi$, giving signals $\phi'_2$ and $\phi'_1$. The signals $\phi'_2$, $\phi'_1$ are produced continuously as long as the power source is connected. A BUSY signal which is the input to an inverter 506 is supplied by address selection circuit 246 and attains a "1" level when the address is a calculation address or display transmission address, and a "0" level when the address is in the initial state. Signal $\phi'_2$ is subjected to an OR operation with the BUSY signal, giving a signal $\phi_2$, and signal $\phi'_1$ is subjected to an AND operation with the BUSY signal, giving the signal $\phi_1$. The signals $\phi_1$, $\phi_2$ are coupled to register clock generating circuit 250 and become the clock signals for each register. Signals $\phi_1$, $\phi_2$ are identical with respective signals $\phi'_1$, $\phi'_2$ when the BUSY signal is at the "1" level, whereas signal $\phi_1$ attains the "0" level and signal $\phi_2$ the "1" level when the BUSY signal is "0". In other words, signals $\phi_1$, $\phi_2$ cease when the address selection circuit is in the initial state. Such a design permits a reduction in power consumption by circulating the signals $\phi_1$, $\phi_2$ in an IC. This system is particularly effective when oscillator 236 and register clock generating circuit 250 are constructed of separate IC chips.

Signal $\phi'_2$ is fed to a timing pulse generating section 508 through an OR gate 510. The generating section 508 generates the timing pulses shown in FIGS. 3 and 4 in response to the signal $\phi'_2$. The output of an inverter 512, which is the other input to OR gate 510, arrives from control circuit 242. A flip-flop (hereinafter referred to as FF) 514 serves to halt the generation of the timing pulses. When the output of FF 514 attains a "1" level, signal $\phi'_2$ appears at the output of OR gate 510; hence, timing pulse generating section 508 begins producing timing pulse output signals. On the other hand, when the output of FF 514 attains a "0" level, the output of OR gate 510 is fixed at a "1" level, so that the timing pulse generating section 508 ceases operation. FF 514 is composed of a set priority trigger reset FF. The setting signals are a key signal, signal $M_{1,2,3}$ and a 1 Hz $\downarrow$ signal, all of which are delivered from an OR gate 513. The key signal is an output signal periodically produced while a button on the keyboard 108 is depressed; the $M_{1,2,3}$ signal is a differentiated output signal produced at the initial operation of either of the external switches 102, 106, 110; and the 1 Hz $\downarrow$ signal is an output signal differentially produced at the falling edge of the 1 Hz time standard signal. Accordingly, FF 514 is set when an external control member is operated, and when the standard time signal falls, thereby producing an output signal as a start signal to initiate the generation of the timing pulses. The trigger reset signal to FF 514 is a NAND signal obtained by a NAND operation on a signal T-II when in the calculation mode or a signal B-III when not in the calculation mode, the signal $\overline{M_{1,2,3}}$ and a signal $\overline{\text{KEY ON}}$. When this so-called NAND signal is rising, FF 514 is reset. The signals T-II, B-II are address signals from the address selection circuit 246, where the T-II signal is an address signal which represents the second word cycle, i.e., the final cycle, of the time-keeping operation address, and the B-II signal is an address signal which represents the final cycle of the display transmission address. The signal $M_{1,2,3}$ is a "0" level signal when any external switch 102, 106, 110 is being operated, and a "1" level signal when such operation ceases. The KEY ON signal attains a "0" level while a button on keyboard 108 is held depressed, and a "1" level when the button is released. Accordingly, FF 514 is reset and produces an output signal as a start signal which halts the generation of timing pulses at the following times:
timepiece mode . . . when the display transmission address is completed
calculation mode
    time-keeping operation . . . when the time-keeping operation address is completed
    calculation operation . . . when the calculation operation is completed as well as the initial time-keeping operation address after conclusion of external control member operation.

In summary actuation of mode changeover switch 102 (shown in FIG. 1) causes a signal $M_{1,2,3}$ to be generated, which passes through OR gate 513 to set the flip-flop 514. Timing pulse generation section 508 is thereby enabled to begin operation, so that timing pulses are produced which cause the contents of a calculation register to be stored in the display register 232. When this has been accomplished, a signal is produced from OR gate 515 (FIG. 5) which causes the output of NAND gate 511 to reset flip-flop 514, so that the operation of timing pulse generation section 518 is halted. Thereafter, timing pulse generation section 518 will remain inoperative until a calculation key is actuated, causing signal KEY to be applied to OR gate 513 to set flip-flop 514. Once keyboard key actuations to perform a particular calculation have been completed, and the calculation result stored in the display register 232, timing pulse generation section 508 will again enter and remain in the inoperative state.

In general, a calculation will have been completed by the time a key is released, or immediately thereafter. Thus, in effect, the only times at which timing pulses will be produced by timing pulse generation section 508 will be the brief instants when keys are actually depressed during a sequence of calculation operations.

Thus, in the present circuitry, the timing pulses are held as soon as they become unnecessary, thereby allowing power consumption to be reduced. In particular, a large power reduction can be obtained since the timing pulses are widely circulated in an IC chip.

Figure 6A:
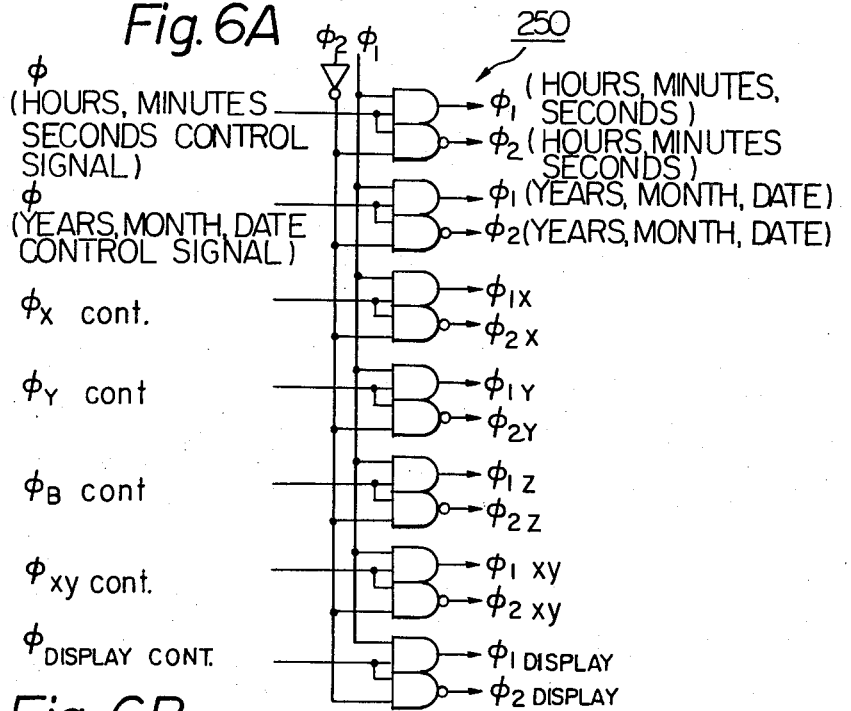
FIG. 6A is a preferred example of a register clock generating circuit, and FIG. 6B the associated timing chart.
Figure 6B:
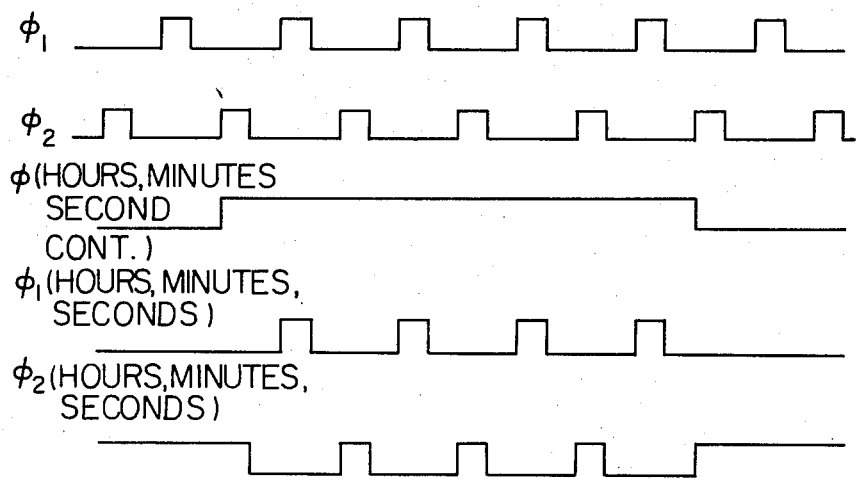

FIG. 6A is an embodiment of the register clock generating circuit 250, and FIG. 6B is the associated timing chart.

Referring to FIG. 6A, signal $\phi_1$ is a signal for each register obtained as the result of an AND operation on control signals for each register as delivered by the control circuit 243, and signal $\phi_2$ is a signal for each register obtained as the result of a NAND operation on said control signals. As can be seen in FIG. 6B when the hours, minutes and seconds control signal $\phi$ of the hours, minutes and seconds register 200 attains a "1" level, the $\phi_1$ hours, minutes and seconds signal becomes the same as the $\phi_1$ signal, and the $\phi_2$ hours, minutes and seconds signal becomes the same as the $\phi_2$ signal. Hence, register 200 is applied with clock signals, and its data is shifted accordingly. When the control signal $\phi$ attains a "0" level, hours, minutes and seconds signal $\phi_1$ and $\phi_2$ are already fixed at "0" and "1" levels, respectively, thereby causing register 200 to cease operation. In this state, the master portion of each bit of the shift register halts in the latched state, and the slave portion halts in the data-loaded state. The clock signals for each register do not include spikes, as can be clearly appreciated from FIG. 6B. Thus, in the circuit of the present invention, clock signals are applied to the necessary shift registers only when a data transfer is required. There is accordingly no dynamic current attributable to the shift registers during ordinary operation, thus allowing power consumption to be reduced to a low level.

Figure 7:
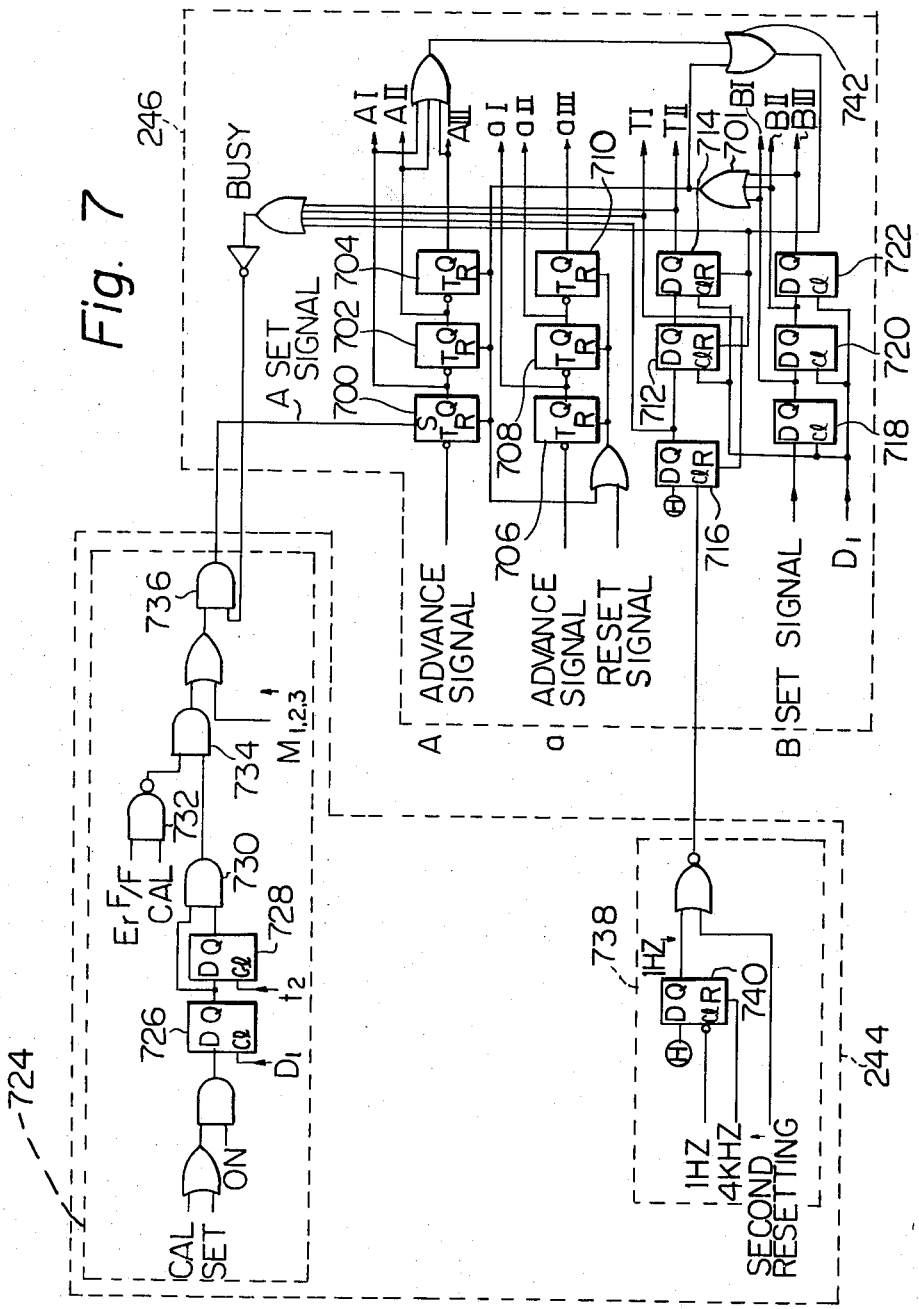
FIG. 7 is an embodiment of an interrupt signal generating circuit and an address selection circuit.

FIG. 7 is an embodiment of the interrupt signal generator circuit 244 and the address selection circuit 246. In the drawing, toggle FF's 700, 702, 704 produce respective signals A-I, A-II, A-III, and constitute an A-counter. Toggle FF's 706, 708, 710 produce signals a-I, a-II, a-III, and constitute an a-counter. The A-counter and a-counter are address counters for calculation operations. Address signals from $A_1$ to $A_7$ are produced from signals A-I, A-II, A-III, and address signals from $a_0$ to $a_7$ are produced from signals a-I, a-II, a-III, where the signals $a_0$–$a_7$ serve as a sub-address function. Data type FF's 712, 714 produce respective signals T-I, T-II, and constitute a time-keeping address counter. The signals T-I and T-II are address signals indicative of the initial one word cycle of the time-keeping operation cycle and the next one word cycle of the operation, respectively. Data type FF 716 is an interrupt-wait flip-flop. Data type FF's 718, 720, 722 produce signals B-I, B-II, B-III, and constitute a display transfer address counter. The signals B-I, B-II, B-III are address signals indicative of the initial, the following, and the final one word cycles, respectively, of the display transfer cycle. The address is in the initial state when the outputs of the calculation operation address counter, the time operation address counter, the display transfer address counter and the interrupt-wait FF are all at a "0" level. At such time, the BUSY signal attains a "0" level. An A-advance signal, a-advance signal, a-reset signal and B- set signal arrive from the control circuit 243 which produces these signals, and hence controls the address, according to the procedure of the calculation or the display.

When an A-set signal is delivered by the circuit portion 724 which is adapted to generate an interrupt signal in response to manipulation of an external control member of the interrupt signal generating circuit 244, FF 700 is set, so that the address of the address selection circuit 246 enters the calculation operation address. The calculation operation address is controlled responsive to the A-advance signal, a-advance signal, and a-reset signal delivered by control circuit 243, and the address necessary for each individual operation is selected. When the calculations are completed, a B-set signal is generated and loaded into FF 718, whereupon the B-I signal attains a "1" level. At the same time, the A-counter and a-counter are reset by the output of OR gate 701, whereby the address shifts to the display transmission address. Signals B-I, B-II, B-III sequentially attain one word cycle each, and the address returns to the initial state when signal B-III attains a "0" level.

The conditions for output of the A-set signal are as follows. In the circuit section 724, a calculation signal attains a "1" level when the calculation mode is established, a SET signal attains a "1" level when the timepiece is placed in the time-setting state by manipulation of the external control switch 106 of FIG. 1, a KEY ON signal attains a "1" level while a button on keyboard 108 is held depressed, an ErF/F signal is the output signal of a flip-flop which is set when the result of a calculation is erroneous, and $M_{1,2,3}\uparrow$ is a signal differentially produced when any external switch 102, 106, 110 is operated. The ErF/F signal is directly reset by a CLEAR KEY, namely the external switch 110 when the calculation mode has been established. A circuit composed of data type FF's 726, 728 and an AND gate 730 produces a narrow pulse delivered from the AND gate when the data input to FF 726 is rising, said pulse being synchronized with the rising portion of the data input signal. Accordingly, when the calculation mode or time-setting state has been established, AND gate 730 produces a narrow pulse when a button on keyboard 108 is operated. A NAND gate 732 and an AND gate 734 are provided to inhibit continuation of calculations when, in the calculation mode, the result of a calculation is erroneous. AND gate 736 is provided to inhibit the production of the A-set signal when the BUSY signal is at a "1" level. Thus, as can be understood from the foregoing, the A-set signal, namely an interrupt signal obtained by manipulating an external control member, is produced when a button on keyboard 108 is operated with the address in the initial state and with no error in the result of a calculation, or when a button on keyboard 108 is operated at such a time that the address is in the initial state and the device in the time-setting state, or when external switch 102, 106, 110 is operated at such a time that the address is in the initial state.

Designated at 738 is a portion of a circuit which generates the time-keeping interrupt signals delivered from the interrupt signal generating circuit 244. A data type FF 740 writes in "1" level signal when the 1 Hz standard time signal falls, and is reset by a 4 KHz signal. As a result, the 1 Hz ↓ output signal from FF 740 becomes a narrow pulse which is synchronized with the decaying portion of the 1 Hz signal. A seconds reset ↑ signal is a narrow pulse produced in synchronism with the rising portion of a signal obtained when external control switch 110 is operated when the device is in the time-setting state. A NOR gate operates on the 1 Hz ↓ signal and seconds reset ↑ signal, giving a time-keeping interrupt signal that sets the interrupt-wait FF 716. In a case where the address of address selection circuit 246 is in the initial state, a "1" level output from interrupt-wait FF 716 is written in FF 712 at the time that the initial signal $D_1$ rises. Signal T-I then attains a "1" level, and the address becomes the clock address; at the same time, the interrupt-wait FF 716 is reset by signal T-I. Since FF 712 is reset by the output obtained from OR gate 742 at such time that the address is not in the initial state, FF 712 cannot load the "1" level output from FF 716, and said interrupt-wait FF 716, which is not in the reset state, waits until the address returns to the initial state. Once signal T-I attains a "1" level, signal T-II attains a "1" level over the next one word cycle; when signal T-II attains a "0" level, the time-keeping operation address is completed. In the calculation mode, the address returns to the initial state at the completion of the time-keeping operation address. In the timepiece mode, a shift is made to the display transfer address as set by signal B-I simultaneously with the completion of the time-keeping operation address, and the address returns to the initial state at the decaying portion of signal B-III.

Thus, since the present invention adopts an interrupt signal system, operation display address signals are produced only when the system requires.

In accordance with the portable electronic device of the present invention, as can be readily understood from the foregoing description, shift register clock signals are halted, without disconnecting the power source, whenever operations are not being performed, thereby allowing power consumption to be reduced to a low level so that a longer battery lifetime can be expected.

The system of the present invention can naturally be applied to all devices which have shift registers and rely on batteries for power, such as calculators and electronic timepieces equipped with a calculator function.

What is claimed is:

1. A portable timepiece calculator, comprising: an oscillator circuit for providing a time base signal;
   a timing pulse generator for generating pulses in response to said time base signal;
   a keyboard having numeric keys and functions keys, for supplying key input signals when actuated;
   a frequency divider for providing a standard time signal in response to said time base signal;
   an interrupt signal generation circuit responsive to said standard time signal and said key input signals, respectively, for generating an interrupt signal;
   an address selection circuit responsive to said interrupt signal for generating a timekeeping operation address signal and a calculation operation address signal;
   a control circuit responsive to said timekeeping operation address signal and said calculation operation address signal for generating a first control signal and a second control signal, respectively, said control circuit being responsive to said key input signals and said calculation operation address signal for enabling the supply of said time base signal to said timing pulse generator, for thereby enabling the operation of said timing pulse generator;
   calculation circuit means responsive to said timing pulses and said key input signals to perform a calculation and provide calculated data;
   an hours, minutes and seconds register and a calculation register for storing hours, minutes and seconds information and said calculated data, respectively;
   a selector responsive to said first control signal to connect said hours, minutes and seconds register with said calculation circuit means to provide a first loop in which time information is circulated, said selector responsive to said second control signal to connect said calculation register with said calculation circuit means to provide a second loop in which calculated data is circulated; and
   a display device responsive to said time information and said calculated data to provide displays of said time information and said calculated data.

* * * * *